Figure 1:
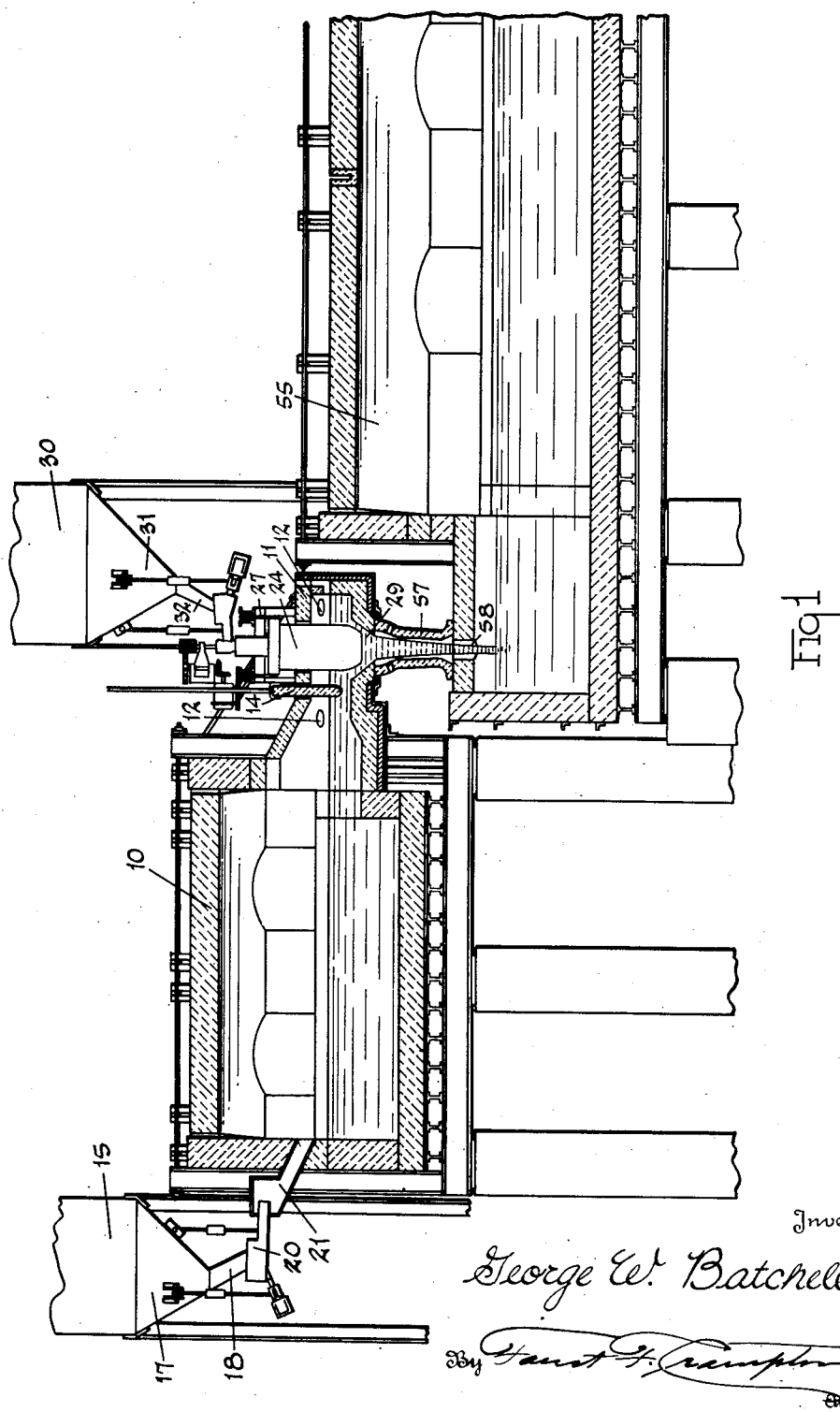

Sept. 1, 1942.　　　G. W. BATCHELL　　　2,294,373
METHOD OF FORMING BATCH BODIES
Filed June 17, 1939　　　5 Sheets-Sheet 1

Inventor
George W. Batchell
By [signature]
Attorney

Sept. 1, 1942.     G. W. BATCHELL     2,294,373
METHOD OF FORMING BATCH BODIES
Filed June 17, 1939     5 Sheets-Sheet 2

Inventor
George W. Batchell
By [signature]
Attorney

Sept. 1, 1942. G. W. BATCHELL 2,294,373
METHOD OF FORMING BATCH BODIES
Filed June 17, 1939 5 Sheets-Sheet 3

Inventor
George W. Batchell
By [signature]
Attorney

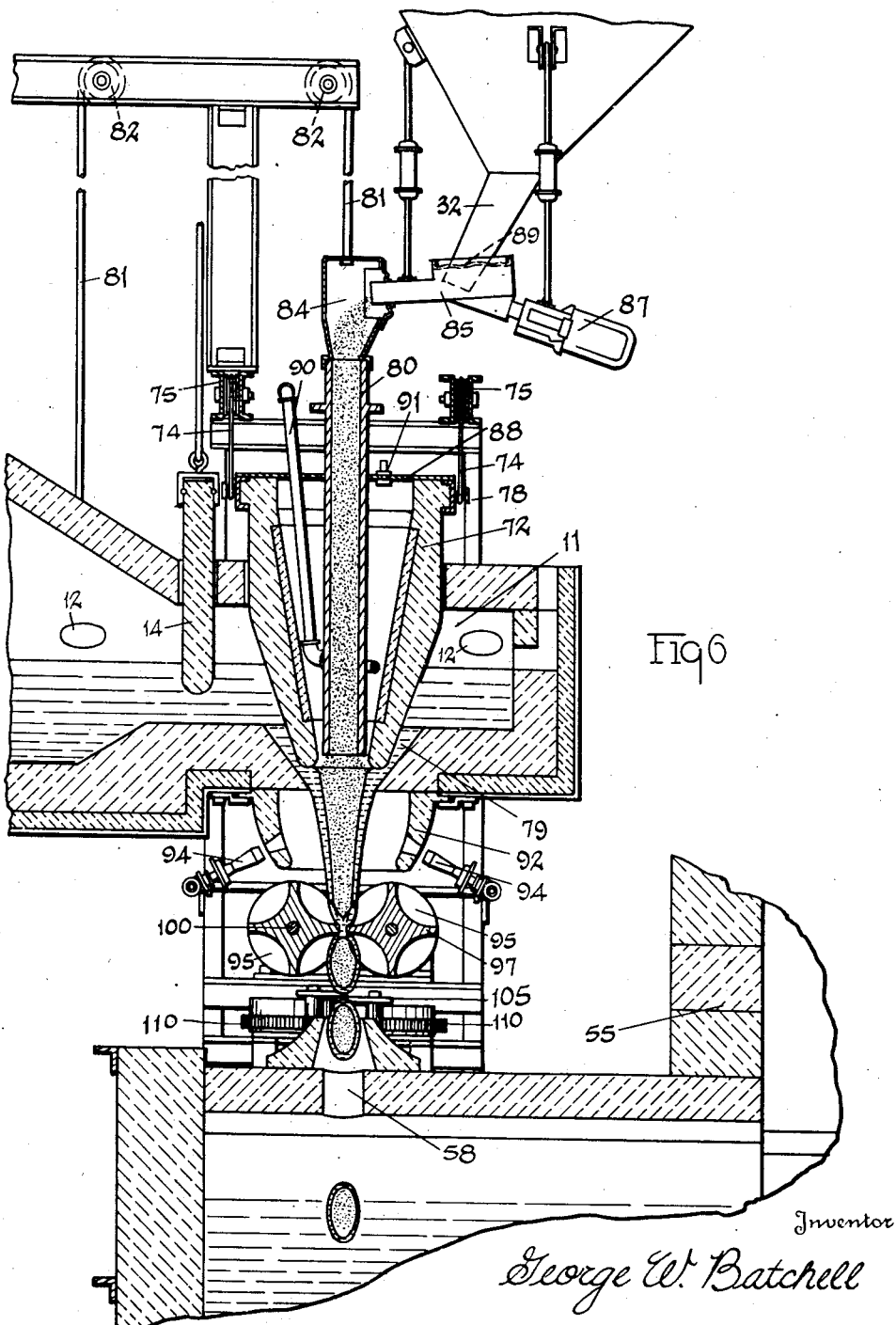

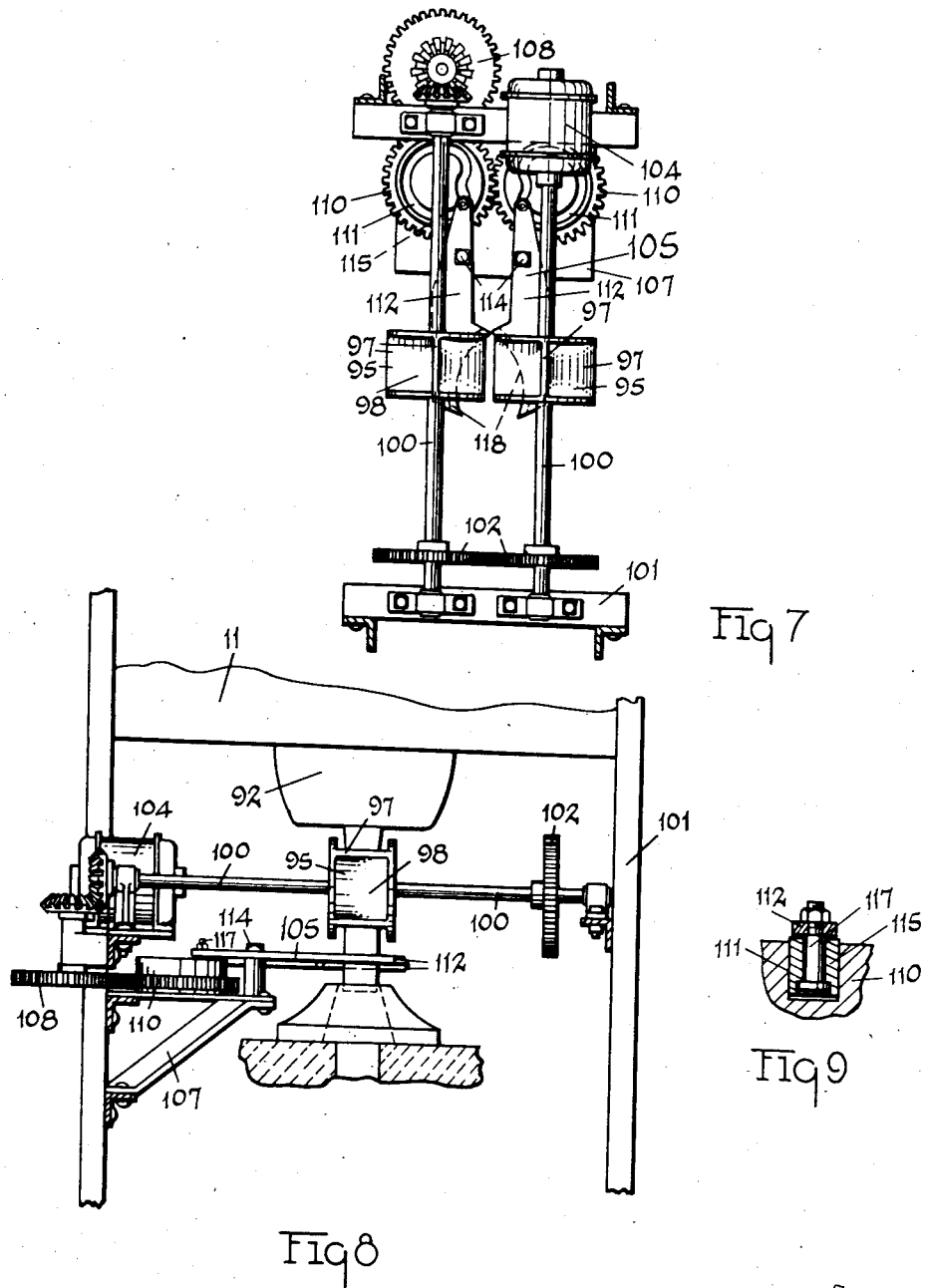

Patented Sept. 1, 1942

2,294,373

UNITED STATES PATENT OFFICE 2,294,373

METHOD OF FORMING BATCH BODIES

George W. Batchell, Toledo, Ohio

Application June 17, 1939, Serial No. 279,715

14 Claims. (Cl. 49—77)

My invention has for its object to eliminate the injurious dust attendant with the manipulation of glass batch materials used in making glass. Batch materials contain pulverant, or finely-divided, materials, largely siliceous in composition, and flux materials comprising compounds, usually containing sodium, potassium, and other alkalies. The glass furnaces are usually connected to large stacks to draw the products of gas combustion from the furnace and through the checkers for preheating air used as both primary and secondary air in gas combustion. When charging the furnace with glass batches, the dust from the batch materials lodges on the interior surfaces of the furnace, such as the walls and the crown, and enters the exhaust ports and, by the heat of the furnace, fluxes the interior surface portions of the refractory blocks and reduces their interior surface portions to molten glass. The finer, subdivided, or pulverant portions of the batch particles are, also, drawn, by the stack draft, into the checkers, with the result that the checkers become clogged with the refractory dust, which reduces the heating efficiency of the air as it is drawn into the furnace upon reversal of the draft through the checkers. Also, the dust discharged into the atmosphere from the tops of the stacks is distributed, by the wind, over the region in which the furnace or furnaces are located, which is strenuously objected to by dwellers located in the region.

The batch materials are often fed, continuously, into the furnaces in order to maintain continuous operation of the furnace. The continuous feed of the batch materials produces a continuous dust that is injurious to the health of the operators and a constant lodgement of the fluxes of the batch upon the surfaces of the interior parts of the furnace, and the broadcasting of dust particles from the tops of the stacks continues without interruption.

By my invention, certain of the batch materials are melted and other of the batch materials are encompassed within the molten material, thus, formed from said certain of the batch materials. The solid subdivided portions may be, thus, entrapped in the heated molten material. The batch bodies may be fed into a glass furnace while the siliceous material, which forms the shell of the batch, is still hot, or, if desired, the batch may be subdivided into small bodies and allowed to gradually cool to remove internal strains and prevent shattering or cracking of the glassy shell and, thus, provide batch materials in the form of briquets that may be subsequently used to make up the batch compositions, as may be desired. The siliceous glassy composition and the subdivided solid portions of the batch material encompassed thereby, may be, if desired, varied to make the batch mixture, which, when melted, will form glass having the desired characteristic properties, or other batch materials may be added to the batch bodies that form my invention to vary, if desired, the glass characteristics. Thus, the batch bodies or briquettes may be substantially delivered to glass furnaces and used with or without other batch materials to form glass having desired characteristics.

When the glass material of the shell melts or is increasingly liquified by the heat of the furnace, it captures the finer particles and prevents the finer particles from being picked up by the draft of the stack and, thus, eliminates clogging of the checkers, distribution over the interior surface parts of the furnace and the ports, and, also, distribution of the dust from the top of the stack.

The invention resides in the method of batch-forming and furnace-feeding batch materials.

The invention has for its object to provide a method for entrapping batch materials in molten siliceous material.

The invention, also, has for its object to provide a method for directing subdivided solid batch materials into an encompassing molten glassy material.

The invention, also, has for its object to provide a method for controlling the relative quantity of the molten siliceous material and the materials enclosed thereby to produce a properly proportioned batch composition of a glass batch body.

The invention, also, has for its object to provide a method for forming a glass batch body containing a uniformly desired proportionate quantity of glass batch materials.

The invention, also, has for its object to provide a method for controlling the viscosity of a molten siliceous material for enclosing subdivided solid batch materials to control the volumetric capacity of the molten shell.

The invention, also, has for its object to provide a method for controlling the rate of movement of molten, encompassing, siliceous material and the enclosed solid batch materials to produce a desired rate of formation of a batch body.

The invention, also, has for its object to provide a batch body having subdivided solid batch materials enclosed in, and filling, a glassy shell formed of other of the batch materials and usable for forming glass.

The invention, also, has for its object to produce other features and advantages, which will appear from the following description and from examination of the drawings forming a part hereof. Structures containing my invention may partake of different forms and the method involving the use of my invention may be varied as to the steps used in producing batch bodies. To illustrate a practical application of the invention, I have selected batch bodies and the method and apparatus for forming the batch bodies and shall describe the method and the selected apparatus for forming the batch bodies that embody my invention, it being understood that certain features of my invention may be used to advantage without a corresponding use of other features of my invention and without departing from the spirit of the invention as set forth in the claims. The particular structure of the apparatus and the form of the batch bodies, selected as examples of embodiments of my invention, are shown in the accompanying drawings.

Figures 2, 3:
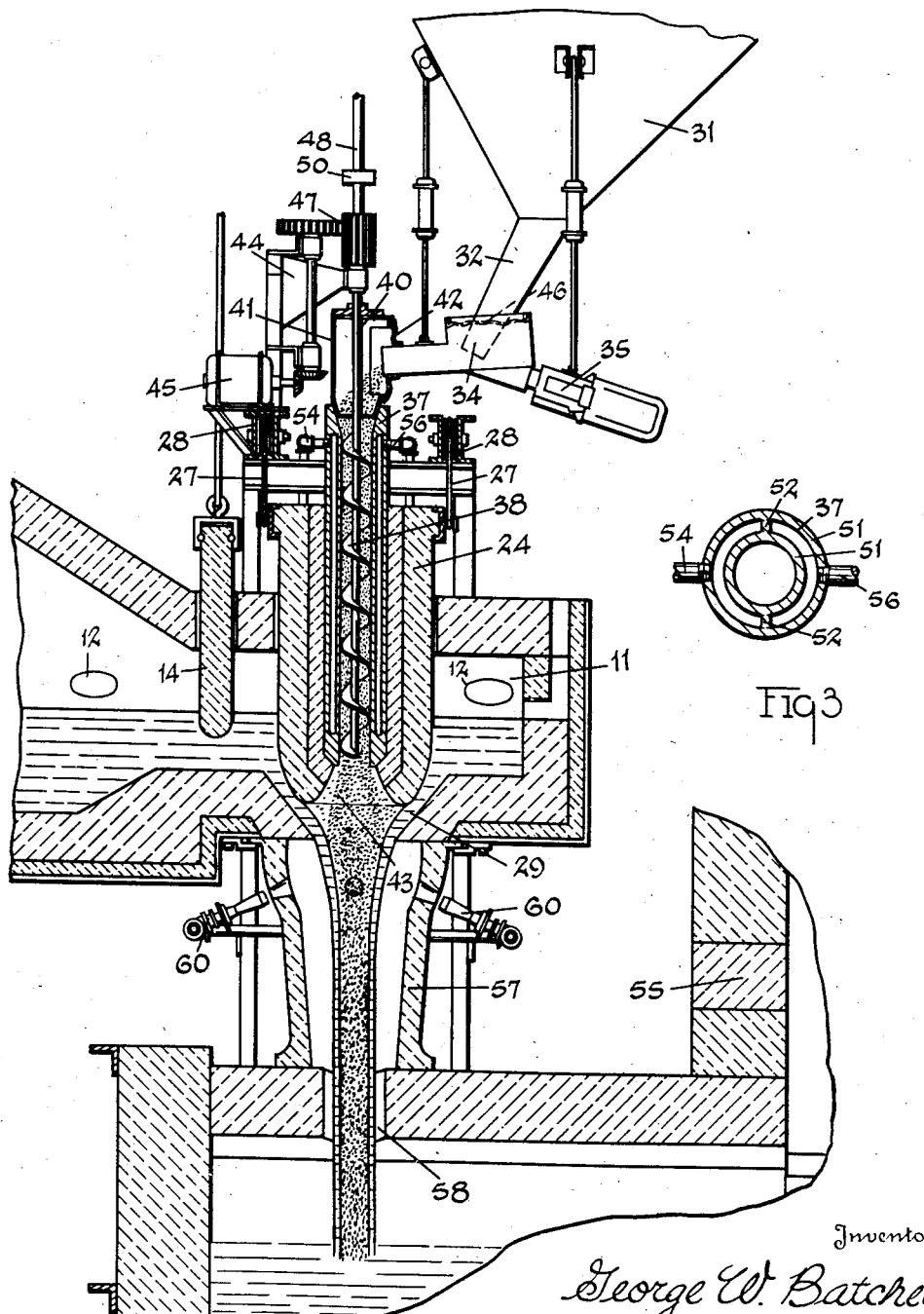
Figure 4:
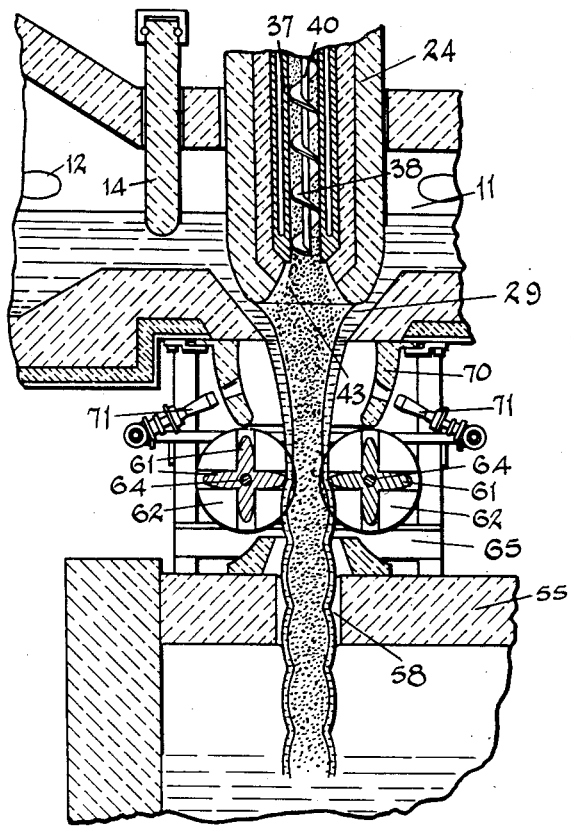
Figure 5:
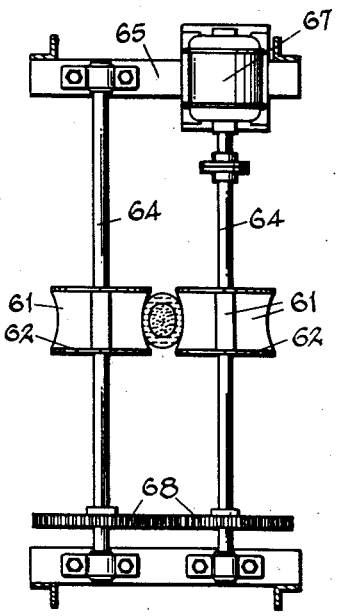

Fig. 1 illustrates a longitudinal section of a batch-body-forming furnace disposed in position to deliver the batch bodies to a glass-melting furnace. Fig. 2 illustrates a view of a section of a forebay from which molten batch materials are discharged as the batch body is formed. Fig. 3 illustrates a view of a section of a feeder spout for feeding solid, subdivided, batch materials into the molten batch materials. Fig. 4 illustrates a modification of the batch-body-producing mechanism shown in Fig. 2. Fig. 5 illustrates a top view of an indenting and drawing mechanism for drawing batch bodies from the furnace as they are formed. Fig. 6 illustrates a further modification of the batch-body-forming mechanisms illustrated in Figs. 2 and 4. Fig. 7 illustrates a top view of an indenting, drawing, and severing mechanism for forming the batch materials into briquets. Fig. 8 is a side view of the mechanism illustrated in Fig. 7. Fig. 9 illustrates a cross-sectional view of a detail of the severing mechanism.

As shown in Fig. 1, a comparatively small furnace 10 is provided with a forebay 11. The furnace 10 may be provided with suitable electric heaters or burners for melting the siliceous materials that form the shells of the bodies, and the forebay 11 may be provided with suitable gas heaters, as indicated by the inlets 12. Also, the forebay may be provided with a suitable gate 14 for closing the chamber of the furnace and for separating the furnace from the forebay, and, also, for producing the desired regulative difference in temperatures in the furnace and in the forebay.

The batch bodies may be formed of different compositions of materials to produce glass of different characteristics or different colors. Thus, water glass may be formed in the furnace and the subdivided, solid, batch portions may be introduced into the water glass as it is drawn from the furnace. Also, cullet, which commonly forms a large part of the silica of glass batches, may be melted in the furnace and the pulverant and solid, subdivided, batch materials may be submerged into the molten mass or entrapped or enclosed by portions of the molten glassy material within the furnace or as the molten glassy material is drawn from the furnace. If desired, glass batch bodies may be directed from the batch-body-forming furnace to the melter, such as a glass-forming furnace or glass-melting pot, or, if desired, the batch, as it is formed, may be severed into parts and the parts may be directed into a chamber or leer for controlling the rate of cooling of the glass to temper the glass, and the batch bodies may be subsequently used in desired quantities in making glass in glass melters or furnaces of any form.

The molten glassy material, or materials that are used to form the enclosing shell of the batch body, is directed through the side of the furnace opposite to that from which the forebay extends. Certain of the batch materials, such as subdivided or broken cullet, or silica and soda, is deposited in a hopper 15 having a funnel 17. The material descends through a spout 18 into the trough of a vibrator feeder 20. The vibrator feeder is of the type-well-known in the art and is operative to, regulatively, feed the material from the hopper 15 into the furnace. The vibrator feeder 20 directs the material at a controlled rate from the hopper into the spout 21, which extends diagonally through an end wall of the furnace 10.

In the form of construction shown, the molten glassy material is caused to flow from the forebay of the furnace and, as it flows therefrom, the solid, batch materials are introduced into glassy material. Preferably, the solid, batch materials are directed between separated flowing portions of the molten glassy material in order to incorporate the solid, batch materials within the exterior surface of the molten glassy material, whereby, upon increased liquefaction of the molten glassy material by heat, such as in a glass batch smelter, the pulverant or finely-subdivided portions of the solid, batch materials will be caught, entrapped, or otherwise engaged by the molten glassy batch material that forms the shell or shells, and escape of the subdivided portions will be prevented.

In the form of construction shown in the drawings, a separator 24 protrudes into the forebay and into the molten glassy material to cause separation of the portions of the molten glassy materials, and enable insertion of the solid subdivided, or pulverant, batch materials, intermediate separated portions of the molten glassy material or impregnation of the molten glassy materials with the solid, batch materials, or the enclosure of the solid, batch materials within a shell or casing that may be formed from one or more streams flowing from the separator.

In the form of construction shown in the drawings, the separator 24 is adjustably supported on the top wall of the forebay 11, as by cables 27 and beams 28, that are connected to the separator 24 with respect to an outlet formed in the bottom of the forebay to control the flow of molten glassy material from the furnace. The separator 24 is formed substantially cylindrical, its lower end terminating into a conical or semi-ovate form, and the surface of the outlet is conical and the lower end is located in substantial alignment with the outlet. The lower end of the separator, thus, forms a substantially annular outlet 29 for regulating the quantity rate of flow of the molten batch material from the furnace. The solid, pulverant, batch materials are, regulatively, fed to the interior of the separator 24 and directed from the separator into molten glassy material as it flows through the annular outlet and, thus, a constant desired, proportionate quantity of the batch materials is produced in the batch body that is formed by the apparatus.

In the form of construction shown, the finely-divided, solid, batch materials are directed from a hopper 30 that may be supported above the forebay 11 by a suitable frame. The hopper 30 is provided with a funnel 31 having a spout 32 that extends into the trough 34 of the vibrator feeder 35. The vibrator feeder 35 is suspended to produce vibratory movements of the trough 34 and, regulatively, discharge the subdivided, solid portions of the solid, batch materials to the separator 24.

The separator 24 has a hollow core 37 in which is located a feed screw 38 that may be provided with a hollow shaft 40 that extends through a head 41 that forms a chamber for receiving the solid batch materials that are directed to the lower end of the separator. The lower end of the separator has an opening 43 that forms an outlet located substantially within the area of the annular outlet 29. The head 41 has a flexible wall 42, through which the trough 34 extends, to enable vibratory movements of the trough 34 and discharge of the solid batch materials into the head 41. The shaft 40 of the feed screw 38 extends through the upper end of the head 41 and is located in a bracket 44 that is supported on a part of the supporting frame of the furnace. The feed screw is, thus, held suspended within the hollow core 37 and is rotated by a motor 45 that is connected by a suitable driving gear 47, also, supported in bearing parts mounted in a frame supported on the furnace frame. The feed screw 38, preferably, has a single helical flange that permits the ready downward movement of the finely-divided, solid, batch material to its lower end. If the solid materials are blocked by the molten material, the screw will, continuously, push the material out from the lower end of the separator and cause the molten glassy material to distend as it flows from the furnace.

The quantity rate of flow or movement of the finely-divided solid batch materials from the hopper 30 into the hollow core 37 may be regulated by the regulation of the vibrator feeder 35, in the manner well-known in the art, to produce the control of the quantity rate at which the solid batch materials are discharged into the core. Also, the rate of rotation of the screw 38 may be regulated which will coact to produce a desired pressure within the core to force the batch material, particularly, from the lower end of the core into the molten glassy material as it flows from the furnace 10 and to maintain a spacial capacity of the glass shell as it is discharged from the furnace, that is, to maintain the molten glassy material distended and in its substantially tubular form as it flows from the furnace.

If desired, the hollow shaft 40, which is opened at its upper and lower ends, may be connected to a source of supply of air under pressure through a pipe 48 by means of a swiveled joint 50, which permits rotation of the shaft 40 relative to the pipe 48 and maintains connection with a source of supply of fluid under pressure, as may be controlled by a suitable valve. The trough 34 may be closed with a flexible wall 46 to prevent escape of air and yet enable the vibratory movement of the trough to regulate the rate of feed of the solid batch materials. The air discharges under pressure from the lower end of the shaft and creates an air pressure within the flowing glassy material and will, also, cooperate with the screw to produce a distention of the molten glassy material or may be used to distend the molten glassy material to permit free downward flow or fall of the solid batch materials into a space formed within the molten glass located at the lower end of the separator 24.

To prevent the high temperature in the forebay from penetrating to a point to cause melting of the finely-divided material, particularly the flux portions, which melt at a relatively low temperature, the core may be cooled by the flow of fluid, such as air, lengthwise the wall of the core 37. Thus, the core 37 may be formed to have a pair of chambers having semi-cylindrical walls 51 and which are partitioned by means of the radially extending walls 52, but which communicate with each other at the lower end of the core 37 and below the lower ends of the partitioning walls 52. Air may be admitted through the pipe 54 and caused to flow through one of the chambers of the core to the lower end of the core and return to the other chamber and be removed, if desired, through the pipe 56.

Where the batch body is fed directly into a glass furnace, such as the furnace 55, the batch body may be surrounded by a shell 57 for preventing chilling by atmospheric air. The batch body moves through the shell 57 and through an opening 58 formed in a top wall of an end part of the furnace 55, particularly, at the end of the melting zone remote from the forebays, from which the glass is drawn to produce glass articles. The glass body will be deposited on the surface of the previously melted glass batch materials and the increased liquidity of the molten batch materials, produced by the increased heat, causes distribution of the batch materials that form the shell, over the solid, subdivided, batch materials and prevents the draft of the furnace from drawing them from the surface of the glass into the furnace, and, as the solid, subdivided, batch materials become increasingly heated, they will soon melt and coalesce with the other batch materials and with the molten glass within the furnace 55. The heat of the molten glassy material that forms the casing of the batch body is, thus, conserved as the body enters the glass of the furnace.

If desired, and in order to maintain the temperature of the casing at a relatively high point and to counteract, to some extent, the chilling produced by the solid batch materials as they are introduced into the casing, and, also, by the surrounding atmospheric air, suitable burners 60 may be provided for directing a flame in the region in which the solid materials are introduced into the molten glass materials as the glass batch flows from the furnace 10.

In the form of construction shown in Fig. 4, provision is made for drawing the batch body from the separator 24 to prevent collection of the finer solid materials at the lower end of the separator 24, that may be caused by the increased viscosity produced by the contact of the solid batch materials with the molten glassy material. The opposite sides of the batch body are engaged by the blades 61 of the wheels 62 located on opposite sides of the batch body. The blades 61 extend radially from the axes of the shafts 64 that rotatably support the wheels on a suitable frame 65 that may be mounted on or suspended from a part of the frame of the furnace 10. The outer edges of the blades 61 are, preferably, semi-ovate in transverse cross-section, substantially as shown in Fig. 4, and are concavedly curved at their end edges, substantially as shown in Fig. 5. The wheels 62 are rotated by a suitable motor 67 that may be connected to one of the shafts 64, the shafts being connected by suitable gear wheels 68 to drive the wheels 62 at the same rate and maintain intermittent registration of the central planes of the blades as they are rotated. The wheels 62 are separated from each other to cause outer edges of the blades to intermittently, simultaneously engage the casing of the batch body on opposite sides thereof and, when, thus, engaged, the wheels, in their rotation, operate to indent the batch body and press the inner surface of the wall of the casing inwardly. The wheels are caused to rotate to maintain a desired rate of draw of the batch body from the forebay 11, and, thus, maintain the solid batch materials in a definite relation with respect to the wall that forms the casing of the batch body and, also, prevent undue attenuation of the batch body by their weight or by reason of excess heat or distortion by reason of irregularly applied heat. The blades of the wheels operate to not only draw the casing of the molten glassy material and the solid batch materials from the separator but, also, operate to sustain the weight of the batch body in a regulative rate and, thus, produce a uniform movement of the batch body from the furnace 10 and a substantially uniform distribution of the solid batch materials within the casing.

The outlet 29 from the forebay of the furnace 10 may be surrounded by a shell 70 that may be suspended from the lower side of the forebay or may be supported on a suitable frame located intermediate the furnaces 10 and 55. Also, the interior of the shell 70 may be heated by the burners 71. The batch body may be directed through the opening 58 into the melting zone of the furnace 55.

In the form of construction illustrated in Fig. 6, the separator is constructed to provide a relatively large interior chamber that affords a large heat-insulating space intermediate the descending solid, subdivided, batch materials and the wall of the separator to prevent melting, particularly, of the comminuted fluxing materials of the batch. The separator 72 is supported by cables 74 located on rollers 75 and secured to a suitable means for the purpose of adjusting the separator 72 with reference to the outlet provided in the forebay to vary the area of the outlet in the forebay. The rollers 75 are supported on a suitable frame 78 that may be supported on the supporting frame of the furnace 10. Preferably, the separator 72 is formed to have a conical lower end and the outlet of the forebay has, preferably, a conical surface and the lower end of the separator extends into the opening in the forebay to form an annular outlet 79 for the flow of the glass from the forebay. Variation of the elevation of the separator 72 will, thus, vary the size of the outlet 79 and the quantity rate of flow of the molten glassy material.

A pipe 80 is suspended by means of a cable 81 extending over rollers 82, pivotally supported on a part of the frame mounted on the supporting frame of the furnace 10 for elevating the pipe 80 and adjustably locating the lower end of the pipe 80 with reference to the lower end of the chamber formed within the separator 72. The upper end of the pipe 80 is provided with a head 84, into which the trough 85 of the vibrator feeder 87 extends, for controlling the quantity rate of discharge from the hopper 30 through the spout 32 into the pipe 80 and to produce, with the adjustibility of the separator 72, a desired ratio as between the discharge of the molten glassy material from the forebay and the batch materials that are discharged through the pipe 80. The quantity of discharge of the solid batch materials is, preferably, limited to the extent of producing a free fall of the solid batch materials from the head 84 into the tubular formation that is produced in the molten glass.

If desired, the upper end of the separator 72 is closed by a cover plate 88 and the trough 85 is, also, closed by a flexible cover 89 and the source of supply of air under pressure is connected to one end of a pipe 90 to create a pressure greater than the atmosphere within the separator 72 to produce a pressure on the interior surface of the molten batch materials below the lower end of the separator 72 and, thus, maintain a distension of the molten glassy material beneath and, particularly, at the lower end of the separator 72, adapted to receive the solid materials that are directed through the pipe 80 and through the opening formed in the lower end of the separator 72. If desired, the lower end of the pipe 90 may terminate in a nozzle turned laterally to cause circulation of the air through the chamber within the separator 72 which may escape from the chamber through restricted openings about the pipes 80 or 90 or through an escape valve, such as the valve 91, but to a limited extent, proportionate to the rate of supply of air through the pipe 90, in order to maintain a desired pressure to sustain the molten glassy material as against its surface tension and to maintain it in tubular form as it flows from the outlet 79 about the lower end of the separator 72.

To control the viscosity of the molten glassy material as it reaches the outlet 79, a shell 92 may be mounted on the lower side of the forebay of the furnace 10 in position to surround the stream of glass discharged from the outlet 79 and burners 94 may be located in position to heat the molten glassy material.

As the batch body is formed, it may be separated into a plurality of chambers by forcing opposite sides of the molten glassy material at spaced points into contact with each other to produce a plurality of sealed chambers filled with the solid materials. A pair of wheels 95, having blades 97 formed by concaved lateral surfaces 98, are supported on shafts 100 that are mounted in suitable bearings secured to brackets located on the frame 101 that forms a part of the supporting frame of the furnace 10. The shafts 100 are connected together by gear wheels 102 and may be driven by a suitable motor 104, operating through suitable reducing gears, to cause rotation of the wheels at a desired rate with respect to the normal movement of the glass from the outlet 79. The blades 97 operate intermittently to engage, simultaneously, opposite sides of the molten glassy material and depress the batch body to cause the opposite sides to contact and to divide the batch body into separate chambers that are filled with the solid batch materials and, also, to regulatively draw the batch body from the opening 79.

If desired, the batch body may be severed along the sealed areas of the chambers as produced by the wheels 95 to divide the batch body into parts and produce subdivisions in the form of briquets. The briquets may be immediately discharged into a glass melter of any form, or the briquets may be discharged into a chamber or onto a belt and conveyed through a leer for regulatively cooling the molten glassy material forming the outer shell of each briquet to prevent shattering due to the strains that commonly exist in glass that is rapidly cooled. The briquets may then be used, as desired, in forming glass by depositing them in a furnace or melting pot and, if desired, with additional batch materials to produce glass articles having the desired characteristics.

In the form of construction shown in Fig. 6, a shearing mechanism 105 is mounted on a suitable bracket 107 that may be secured to the frame 101 and operated by the motor 104. One of the shafts 100 may be connected by a suitable drive gear 108 to a pair of gear wheels 110 having cam-shaped channels 111. A pair of shears 112, pivotally supported on the plate 107 by means of the pivot pins 114, are operated by the cam wheels 110. A pair of rollers 115 are supported in the channels 111 by means of the pins 117 which are connected to one end of each of the shears 112. The opposite end of the shears is provided with a glass cutting-edge part 118, whereby the oscillatory movements produced by the action of the cams 111 on the rollers 115 operate to cause the edges 118 to intermittently shear the body within the depressed area, to form briquets that may be used immediately within the glass-forming furnace 55 or may be annealed for future use to make up batch materials for producing glass.

I claim:

1. The method of forming a glass batch which consists in melting certain of the solid subdivided glass batch materials; flowing the molten glassy material; subjecting the interior of the flowing molten glassy material to air pressure to cause it to flow in hollow form; and causing solid subdivided batch materials to move gravitationally into the interior space of the hollow flowing molten glassy material.

2. The method of forming a glass batch which consists in melting a siliceous material; flowing the molten siliceous material into space-enclosing form; directing subdivided solid batch materials into the space enclosed by the molten siliceous material; and depressing the surfaces of the space-enclosing form of the molten siliceous material at spaced points along opposite side surfaces thereof.

3. A method of forming a glass batch which consists in melting a siliceous material; flowing the molten siliceous material into space-enclosing form; directing subdivided solid batch materials into the space enclosed by the molten siliceous material; and pressing opposite sides of the space-enclosing form of the molten siliceous material into contact with each other at spaced points along the said opposite sides.

4. The method of forming a glass batch which consists in melting a siliceous material; flowing the molten siliceous material into space-enclosing form; directing subdivided solid batch materials into the space enclosed by the molten siliceous material; pressing opposite sides of the space-enclosing form of the molten siliceous material into contact with each other at spaced points along the said opposite sides; and separating the molten siliceous material and the enclosed solid subdivided batch material at said spaced points into parts.

5. The method of forming a glass batch which consists in melting a siliceous material; flowing the molten siliceous material into space-enclos- ing form; directing subdivided solid batch materials into the space enclosed by the molten siliceous material; and depressing and drawing the space-enclosing form of the molten siliceous material at spaced points.

6. The method of forming a glass batch which consists in melting a siliceous material; forming from the siliceous material a space-enclosing part; directing solid subdivided batch materials into the space of the space-enclosing part; and pressing spaced portions of the space-enclosing part into contact with each other to form sealed subdivisions of the space-enclosing part, each containing solid subdivided batch materials.

7. The method of forming glass batch bodies which consists in melting batch ingredients; forming from the resultant molten mass a hot pliant glass tube container; directing pulverulent glass batch ingredients into the tube in continuous measured quantities; indenting and drawing the filled tube; and severing the tube into subdivided and sealed sections.

8. A method of forming a glass batch for producing glass by heating the batch material, which consists in melting siliceous material of the batch material; forming, from the siliceous material, a space-enclosing part; directing solid subdivided batch materials into the space of the space-enclosing part; and pressing spaced portions of the space-enclosing part to form subdivisions of the solid subdivided batch materials.

9. The method of forming a glass batch containing siliceous materials and other materials for forming glass, which consists in melting the siliceous material of the batch material; flowing the molten siliceous material into tubular form; and directing the unmelted other materials in sub-divided solid form into the interior of the tubular space in the siliceous material to enclose and retain therein the solid subdivided batch material.

10. The method of forming a glass batch consisting of a mixture of different materials for forming glass, which consists in melting certain of the glass batch materials in a furnace; flowing the molten glassy material in tubular form from the furnace; and directing other of the batch materials in solid sub-divided form into the interior of the tubular form of the flowing molten glassy material as it is delivered from the furnace to enclose and retain within the glassy wall of the tubular form the solid subdivided batch materials.

11. The method of forming a glass batch consisting of a mixture of different materials, which consists in melting certain of the glass batch materials in a furnace to form a molten glassy material; flowing the molten glassy material in tubular form from the furnace; depositing other of the batch materials in solid subdivided form within the tubular form of the molten glassy material; and drawing the tubular molten glassy material and the subdivided material enclosed therein from the furnace.

12. The method of forming a glass batch consisting of a mixture of different materials, which consists in melting certain of the glass batch materials in a furnace to form a molten glassy material; flowing the molten glassy material in tubular form; depositing other of the batch materials in solid subdivided form within the tubular form of the molten glassy material; indenting the molten glassy material; and drawing the tubular molten glassy material and the subdivided materials enclosed therein from the furnace.

13. The method of forming glass from subdivided glass batch material which consists in melting certain of the glass batch material in a furnace to form a glassy material; flowing the molten glassy material in hollow form from the furnace; and gravitationally pouring other of the subdivided solid batch materials into the space formed in the hollow molten glassy material and subsequently introducing and heating the enclosed and enclosing batch materials into a glass-forming furnace.

14. The method of forming glass by heating a glass batch material, which consists in melting siliceous material; flowing the molten siliceous material of the batch material into space-enclosing form and directing solid batch materials into the said space-enclosing form of heated siliceous material to substantially fill the interior of the space with solid subdivided batch materials and subsequently heating the enclosed batch materials and the siliceous materials.

GEORGE W. BATCHELL.